United States Patent
Bacso et al.

[15] 3,682,985
[45] Aug. 8, 1972

[54] 17α-PROPADIENYL-SUBSTITUTED STEROIDS

[72] Inventors: Imre Bacso, 320 South Street, Morristown; Robert V. Coombs, 412 Morris Avenue, Summit, both of N.J.

[22] Filed: Sept. 4, 1970

[21] Appl. No.: 69,929

[52] U.S. Cl. ............260/397.4, 260/397.5, 424/243
[51] Int. Cl. ............................................C07c 169/22
[58] Field of Search ......./Machine Searched Steriods

[56] References Cited

OTHER PUBLICATIONS

Dferassi– Steroid Reactions p. 129 (1963) Holden-Day, San Francisco.

*Primary Examiner*—Henry A. French
*Attorney*—Gerald D. Sharkin, Frederick H. Weinfeldt, Robert S. Honor, Walter F. Jewell and Richard E. Vila

[57] ABSTRACT

13-alkyl-17-beta-hydroxy-17-alpha-propadienylgona-4,9-dien-3-ones are useful as pharmaceuticals and are obtainable by a multi-step procedure, which involves carrying out a Mannich-type reaction to convert a 17-alpha-ethynyl-substituted 4,9-dien-3,17-beta diol steroid to its 17-alpha-dialkylaminopropynyl-substituted analog, which is then converted to a quaternary ammonium salt, which is then reduced using a complex metal hydride to obtain the corresponding 17-alpha-propadienyl-diol product, which is then oxidized at the 3-position to the corresponding 17-beta-hydroxy 3-keto-final product.

6 Claims, No Drawings

17α-PROPADIENYL-SUBSTITUTED STEROIDS

This invention relates to steroidal compounds, and more particularly to the preparation of certain 17-alpha-propadienyl-substituted-4,9-dien steroidal compounds.

The final compounds obtainable by the process of this invention are represented by the Formula I,

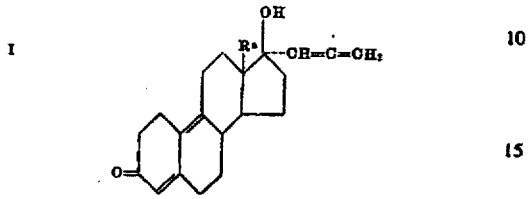

wherein $R^a$ is alkyl having from one to three carbon atoms, e.g., methyl, ethyl, n-propyl and isopropyl; and preferably is unbranched.

The above-described compounds I are disclosed in the literature as being prepared by a process which employs a "protected" intermediate, i.e., in the form of a 3-ketal, e.g., ethylenedioxy, 5(10), 9(11)-diene intermediate, which requires conversion by acid hydrolysis-rearrangement to the final product. The present invention provides a convenient and efficient method for preparing compounds I in significantly improved yield and purity.

A process of this invention for the preparation of the above-described compounds I, may be conveniently represented by the following reaction scheme wherein $R^a$ is as defined above, each of $R'$ and $R''$ is, independently, lower alkyl, e.g., having from one to three carbon atoms, such as methyl, ethyl, n-propyl and isopropyl, and is preferably unbranched; and $R'$ and $R''$ may be joined to form, in conjunction with the nitrogen atom, a ring having from four to six carbon atoms, such as a pyrrolidino or piperidino or homopiperidino group; and, $R'''$ is lower alkyl, e.g., having from one to three carbon atoms, such as methyl, ethyl, n-propyl and isopropyl and is preferably unbranched; and Y is a monovalent ion of a halogen atom having an atomic weight of from 34 to 128; i.e., chloro, bromo, or iodo, or the residue of a sulfonic acid, e.g. of an alkylsulfonic acid such as a mesylate ion, or of an aromatic sulfonic acid, such as a tosylate ion, or the like. It will be noted in the reaction scheme that the geometric identity of the hydroxy group at the 3-carbon atom of ring A is immaterial to the procedure, as such hydroxy group is eventually oxidized to the carbonyl. Hence, the 3 alpha or 3 beta isomers or a mixture thereof can be employed as the compound X.

REACTION SCHEME

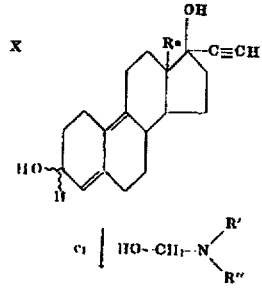

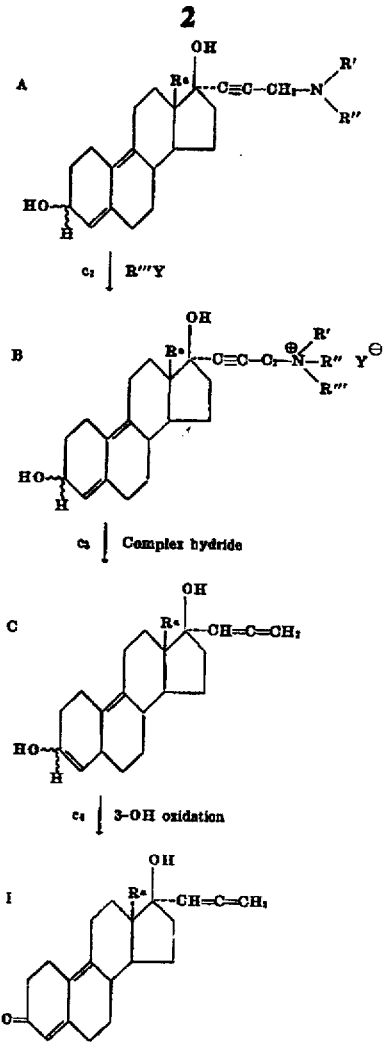

With reference to the Reaction Scheme, Process step $c_1$ is a condensation of a suitable 17α-ethynyl-17β-hydroxy substituted steroid with a suitable dialkylamino-methanol. Process $c_1$ can be carried out under conditions conventionally employed in carrying out Mannich reactions. Preferably, Process $c_1$ is carried out in the presence of cuprous ions and small amounts of (e.g., acid, ce.g., acetic acid), at temperatures of from about 10° to 80°C., preferably from about 50° to 70°C., in an inert organic solvent, such as dioxane or tetrahydrofuran. A preferred source of cuprous ion is cuprous chloride.

Process $c_2$ involves the quaternization of the compound A with a reagent $R'''X$, to give the corresponding quaternary ammonium salt (compound B). The quaternization (process $c_2$) may be carried out in the conventional manner, e.g., in a suitable solvent, such as acetone, at a temperature of from −20° to +30°C.; neither the solvent nor the temperature conditions being critical. A preferred $R'''Y$ is methyl iodide.

Process $c_3$ is a reduction of the compound B with a complex hydride, such as lithium aluminum hydride.

Process $c_3$ may be carried out in an inert organic solvent, e.g., dimethyl ether, pyridine or tetrahydrofuran, e.g., at a temperature of from −80° to +80°C.; neither the solvent nor the temperature conditions being critical.

In Processes $c_1$ and $c_2$ it is preferred that R', R" and R''' are the same, and it is particularly preferred they are all methyl.

Process $c_4$ involves oxidizing the 3-hydroxy group of compound C with an oxidizing agent conventionally employed in oxidizing an allylic secondary hydroxy group to a keto group, e.g., quinones such as p-benzoquinone, chloranil or 2,3-dicyano-5,6-dichlorobenzoquinone or activated manganese dioxide, e.g., at from 10° to 50°C., preferably at 20° to 30° C. in an inert solvent, e.g., a cyclic ether such as dioxane, or a tertiary alkanol, such as t-butanol.

In the above-described procedures, the starting materials and reagents are known and may be prepared by methods described in the literature, or where not known may be prepared in a manner analogous to that for preparing the known compounds. For example, the known compound 17α-ethynylestra-5(10)-en-17β-ol-3-one may be converted to its 4,9-diene analog by treatment with pyridinium hydrobromide perbromide, i.e., 17α-ethynylestra-4,9-dien-17β-ol-3-one, which upon reduction of the 3-carbonyl yields the corresponding compound X, i.e., a mixture of 17α-ethynylestra-4,9-diene-3β,17β and 3β,17β-diol.

The above-described compounds I are useful because they possess pharmacological properties in animals. In particular, such compounds are useful as fertility control agents in animals as they possess progestational activity as indicated by standard tests, such as the clauberg test, e.g., the method basically described in Endocrinology 63 (1958) 464 wherein the rabbit is given 0.01 to 1.0 milligrams of active agent.

These compounds may be combined with a pharmaceutically acceptable carrier or adjuvant. They may be administered orally or parenterally. The dosage will vary depending upon the mode of administration utilized and the particular compound employed. However, in general, satisfactory results are obtained when the compounds are administered at a daily dosage of from about 0.01 milligrams to 2 milligrams. It will be appreciated by those skilled in the art, that the daily dosage level is independent of body weight. Dosage forms suitable for internal administration comprise from about 0.005 milligrams to about 2 milligrams of the compound in admixture with a solid or liquid pharmaceutical carrier or diluent.

The compounds of Formula I are also useful as menstrual function regulating agents in primates. For the above-mentioned used the compounds of Formula I may be administered alone in the manner and dosage described above, or in combination with a suitable estrogenic agent, the latter for example at a dosage of about 0.1 mg. The estrogenic agent may be administered alone in the first part of the menstrual cycle, and in admixture with the compound of Formula I in the latter days of the cycle.

A representative formulation suitable for oral administration is a tablet prepared by standard tabletting techniques which contains the following:

| Ingredients | Part by weight |
|---|---|
| 17α-Propadienylestra-4,9-dien-17β-ol-3-one | 0.05 |
| Tragacanth | 2 |
| Lactose | 89.45 |
| Corn starch | 5 |
| Talcum | 3 |
| Magnesium stearate | 0.50 |

This invention is illustrated but not limited by the following example, wherein all temperatures are Centragrade, and room temperature is 20° to 30°C., unless indicated otherwise.

EXAMPLE

17α-Propadienylestra-4,9-dien-17β-ol-3-one

Step 1

Mixture of 17α-ethynylestra-4,9-dien-3α,17β and 3β,17β-diol

Two hundred and twenty-five g. of 17α-ethynylestra-4,9-dien-17β-ol-3-one and 4.5 liters of dry methanol are charged to a vessel. Sixty g. of sodium borohydride are added with stirring, at room temperature, portionwise over a period of 3 hours. Stirring is continued for an additional hour.

Five hundred ml. of water are carefully added to the reaction mixture, the mixture concentrated under vacuum to 2 liters at 40°C., then poured into 4 liters of saturated aqueous sodium chloride and 4 liters of water. An oil containing the product separates, which oil is extracted with methylene chloride. The methylene chloride extracts are combined, washed with saturated aqueous sodium chloride, dried over anhydrous sodium sulfate, filtered and then concentrated to obtain a mixture of 17α-ethynylestra-4,9-diene-3α,17β-diol and 17α-ethynylestra-4,9-diene-3β,17β-diol as an oil.

Step 2

17α-Dimethylaminopropynylestra-4,9-dien-3α,17β-and-3β-17β-diol

Two hundred and thirty-six g. of the mixture of 17α-ethynylestra-4,9-diene-3α,17β-and-3β,17β-diol (obtained in Step 1), 2.25 liters of p-dioxane, 225 ml. of dimethylaminomethanol, 3.75 g. of cuprous chloride and 135 ml. of glacial acetic acid are charged to a vessel, and the mixture stirred, at 50°C. for 1.5 hours. 1.3 liters of the p-dioxane are removed by distilling under vacuum at 50°C. The resulting concentrate is then poured into a mixture of 6 liters of saturated aqueous sodium chloride and 2 liters of water. A solution of 165 g. of anhydrous potassium carbonate in 1 liter of water is then added thereto. The resulting mixture is then extracted with methylene chloride. The combined methylene chloride extracts are then washed twice with saturated aqueous sodium chloride, dried over anhydrous sodium sulfate, then concentrated under vacuum to about 3 liters, treated with charcoal, filtered, and the filtrate evaporated to a syrup. Residual p-dioxane is then removed under high vacuum to obtain a mixture of 17α-dimethylaminopropynylestra-4,9-diene-3α,17β-and-3β,17β-diol as an oil and is used in the next step (Step 3).

Step 3

Methiodide salt

Two hundred and sixty-five g. of a mixture of 17α-dimethylaminopropynylestra-4,9-diene-3α,17β-and-3β,17β-diol and 2.65 liters of acetone are charged to a vessel and 265 ml. of methyl iodide are added dropwise over a period of about one-half hour, with stirring, resulting in formation of crystals of methiodide salt. Stirring is continued for an hour after addition of the methyl iodide has been completed. The crystals of the product are recovered by filtration, washed with ice-cold acetone, the acetone solvent removed under vacuum to obtain the methiodide, which is used for the next reaction step (Step 4).

Step 4

Mixture of 17α-propadienylestra-4,9-diene-3α,17β- and-3β,17β-diol

Two hundred and twenty g. of the methiodide salt obtained in Step 3 and 6.6 liters of dry pyridine are charged to a vessel. Forty-nine g. of lithium aluminum hydride is added portion-wise to the stirred mixture, at a rate such that the temperature of the mixture does not exceed about 50°C. The reaction mixture is then cooled to room temperature and 49 ml. of water, the 49 ml. of 15 percent aqueous sodium hydroxide solution, then 150 ml. of water are carefully added to the reaction mixture at a rate such that the temperature does not exceed 50°C. Solids are separated by filtration, then washed with pyridine. The filtrate and wash are combined and concentrated under vacuum to a syrup, which is then taken up in 1.5 liters of toluene. The toluene solvent is then removed by distilling under vacuum and the residue is then taken up in methylene chloride which is then washed with water, then saturated aqueous sodium chloride, dried over anhydrous sodium sulfate and filtered. The methylene chloride solution is then concentrated to a syrup which is then taken up in 2 liters of acetone (any insolubles being filtered off). The acetone solvent is then removed under vacuum to obtain the product as an oil.

Step 5

17α-propadienylestra-4,9-dien-17β-ol-3-one 138.3 g. of the mixture of 17α-propadienylestra-4,9-diene-3α,17β-and-3β,17β-diol obtained in Step 4, and 1,380 ml. of p-dioxane are charged to a vessel. One hundred and twenty-five g. of 2,3-dicyano-5,6-dichloro-benzoquinone in 690 ml. of p-dioxane is slowly added thereto, the temperature of the mixture being maintained at about 30°C. After stirring for 1 hour at room temperature, 103.5 g. of anhydrous potassium carbonate and 44 g. of sodium dithionite in 1 liter of water is added while the temperature of the mixture is maintained at or below 30°C. The reaction mixture is then poured into 8 liters of saturated aqueous sodium chloride and extracted with ether. The ether extracts are combined, washed with saturated aqueous sodium chloride and then evaporated under high vacuum to obtain an oily residue. The residue is taken up in ether and the ether solution is passed through an aluminum oxide column to yield the product, i.e., 17α-propadienylestra-4,9-dien-17β-ol-3-one, m.p. 111°-113°C.

What is claimed is:

1. A process for preparing a compound of the formula

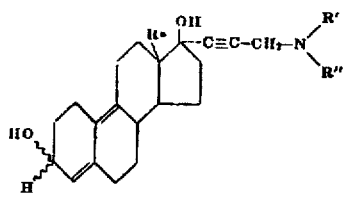

wherein $R^a$ is alkyl having from one to three carbon atoms; and each of R' and R'' is, independently, lower alkyl; and R' and R'' may be joined to form, in conjunction with the nitrogen atom, a ring having from four to six carbon atoms, by reacting a steroidal compound of the formula

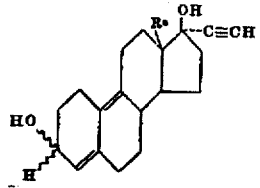

wherein $R^a$ is as defined above, with a dialkylaminomethanol compound of the formula

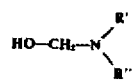

wherein R' and R'' are as defined above, in the presence of cuprous ions and acetic acid at temperatures of from about 10° to 80° C., in an inert organic solvent.

2. A process of claim 1 wherein each of $R^a$, R' and R'' is methyl.

3. A process for the preparation of a 3-keto-compound of the formula

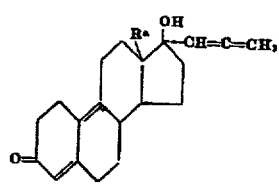

wherein $R^a$ is alkyl having from one to three carbon atoms; which comprises a. reacting a 17alpha-ethoxy-substituted compound of the formula

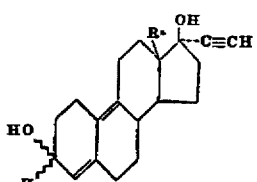

wherein $R^a$ is as defined above with a dialkylaminomethanol of the formula

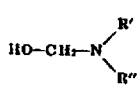

wherein each of R' and R'' is, independently, lower alkyl; and R' and R'' may be joined to form, in conjunction with the nitrogen atom, a ring having from four to six carbon atoms in the presence of cuprous ions and acetic acid at temperatures of from about 10° to 80° C., in an inert organic solvent; to obtain a 17alpha-dialkylamino propynyl-substituted compound of the formula

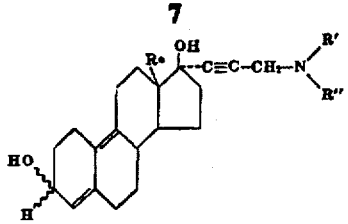

wherein R$^a$, R' and R'' are as defined above;
b. which dialkylaminopropynyl-substituted compound is then reacted with a compound of the formula $$R'''-Y$$

wherein R''' is lower alkyl; and Y is a monovalent ion of a halogen atom having an atomic weight of from 34 to 128, or residue of a sulfonic acid, to obtain a quaternary salt of the formula

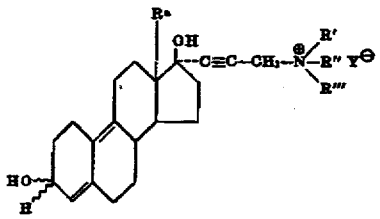

wherein R$^a$, R', R'' and R''' and Y are as defined above;
c. which quaternary salt is reduced with lithium aluminum hydride to obtain a diol compound of the formula

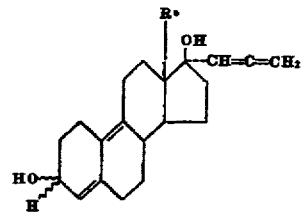

wherein R$^a$ is as defined above; and
d. which diol compound is then oxidized at the 3-position to the 3-keto compound, as defined above, in the presence of an oxidizing agent which is selected from the group consisting of p-benzoquinone, chloranil, 2,3-dicyano-5,6-dichlorobenzoquinone and activated manganese dioxide, at from 10° to 50° C., in an inert solvent.

4. A process of claim 3, wherein each of R$^a$, R', R'' and R''' is methyl and Y is iodo.

5. A process for the preparation of a quaternary salt of the formula

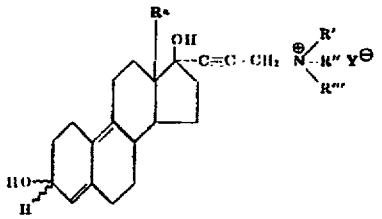

wherein R$^a$ is alkyl having from one to three atoms; each of R' and R'' is, independently, lower alkyl; and R' and R'' may be joined to from, in conjunction with the nitrogen atom, a ring having from four to six carbon atoms; R''' is lower alkyl; and Y is a monovalent ion of a halogen atom having an atomic weight of from 34 to 128, or residue of a sulfonic acid, which comprises
a. reacting a 17alpha-ethynyl-substituted compound of the formula

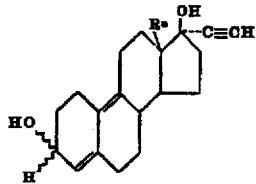

wherein R$^a$ is as defined above with a dialkylaminomethanol of the formula

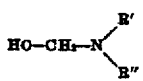

wherein R' and R'' are defined above, in the presence of cuprous ions and acetic acid at temperatures of from about 10° to 80° C., in an inert organic solvent; to obtain a 17alpha-dialkylamino propynyl-substituted compound of the formula

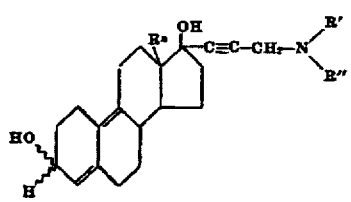

wherein R$^a$, R' and R'' are as defined above;
b. which dialkylaminopropynyl-substituted compound is then reacted with a compound of the formula $$R'''-Y$$

wherein R''' and Y are as defined above to obtain the quaternary ammonium salt.

6. A process of claim 5 wherein each of R$^a$, R', R'' and R''' is methyl and Y is iodo.

* * * * *